US012592563B2

(12) United States Patent (10) Patent No.: US 12,592,563 B2
Pan (45) Date of Patent: Mar. 31, 2026

(54) BATTERY PACK AND ENERGY STORAGE SYSTEM

(71) Applicant: Huawei Digital Power Technologies Co., Ltd., Shenzhen (CN)

(72) Inventor: Yangbo Pan, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/024,108

(22) Filed: Jan. 16, 2025

(65) Prior Publication Data

US 2025/0246908 A1 Jul. 31, 2025

(30) Foreign Application Priority Data

Jan. 26, 2024 (CN) .......................... 202410122195.0

(51) Int. Cl.
*H02J 3/00* (2006.01)
*H01M 10/42* (2006.01)
*H02J 3/0073* (2026.01)
*H02J 3/32* (2006.01)

(52) U.S. Cl.
CPC ....... *H02J 3/0073* (2020.01); *H01M 10/4264* (2013.01); *H02J 3/32* (2013.01); *H01M 2220/10* (2013.01)

(58) Field of Classification Search
CPC ........ H02J 3/0073; H02J 3/32; H02J 2207/20;
H02J 2300/24; H02J 3/388; H02J 7/345;
H02J 7/0063; H02J 3/381; H02J 9/062;
H01M 10/4264; H01M 2220/10; H02M
1/0032; H02M 1/36
See application file for complete search history.

(56) References Cited

U.S. PATENT DOCUMENTS

| | | | | |
|---|---|---|---|---|
| 2011/0298424 A1* | 12/2011 | Yamauchi | ............... | B60L 58/12 |
| | | | | 320/118 |
| 2013/0043727 A1* | 2/2013 | Liu | ........................... | H02J 1/10 |
| | | | | 307/31 |
| 2013/0088900 A1* | 4/2013 | Park | ........................ | H02J 3/32 |
| | | | | 363/71 |
| 2018/0366970 A1* | 12/2018 | Zhou | .................... | H02J 7/0034 |

FOREIGN PATENT DOCUMENTS

| | | |
|---|---|---|
| CN | 104882906 A | 9/2015 |
| CN | 113328453 A | 8/2021 |
| CN | 114567004 A | 5/2022 |
| CN | 114977351 A | 8/2022 |
| CN | 115733237 A | 3/2023 |
| CN | 116581862 A | 8/2023 |

* cited by examiner

*Primary Examiner* — Lincoln D Donovan
*Assistant Examiner* — Alex W Lam
(74) *Attorney, Agent, or Firm* — Maier & Maier, PLLC

(57) ABSTRACT

A battery pack and an energy storage system. The battery pack is configured to supply power to an inverter. The battery pack includes a battery, a conversion circuit, and a black start circuit. The conversion circuit is configured to connect to the inverter through a power bus. The black start circuit includes a first auxiliary power supply, a first capacitor, a switch module, an isolation switch, and a control module.

20 Claims, 11 Drawing Sheets

A battery voltage is less than a second threshold and a dormancy switch is in a turned-on state A control module sends a dormancy control signal 1

A dormancy switch K3 is turned off

A main switch K1 is turned off

A first auxiliary power supply has no power supply source

A battery pack enters a dormancy state

BATTERY PACK AND ENERGY STORAGE SYSTEM

CROSS-REFERENCE TO RELATED APPLICATION

This application claims priority to Chinese Patent Application No. 202410122195.0, filed on Jan. 26, 2024, which is hereby incorporated by reference in its entirety.

TECHNICAL FIELD

The embodiments relate to the field of power electronics technologies, and to a battery pack and an energy storage system.

BACKGROUND

An inverter, a battery pack, a photovoltaic unit, an alternating current power grid, or the like may form a power supply system. The battery pack includes an energy storage battery that can be charged and discharged. In the power supply system, the inverter may start to operate based on electric energy provided by the photovoltaic unit or the alternating current power grid, and perform voltage conversion, to charge the battery pack via the photovoltaic unit or the alternating current power grid, supply power to a load via the battery pack, and the like.

When there is no power supplied by the photovoltaic unit or the alternating current power grid, the inverter cannot obtain electric energy from the photovoltaic unit or the alternating current power grid to implement forward start for operating. In this case, the battery pack needs to implement black start to supply power to the inverter, so that the inverter can start to operate.

Generally, in a system that controls black start of the battery pack, a black start module component such as a black start power supply needs to be additionally added, resulting in high costs.

SUMMARY

The embodiments provide a battery pack and an energy storage system to reduce costs of the battery pack while implementing black start.

According to a first aspect, the embodiments provide a battery pack, where the battery pack is configured to supply power to an inverter, and the battery pack includes a battery, a conversion circuit, and a black start circuit. The conversion circuit is configured to connect to the inverter through a power bus. The conversion circuit may be configured to: obtain electric energy from the power bus to charge the battery, and release the electric energy stored in the battery to the power bus. The black start circuit includes a first auxiliary power supply, a first capacitor, a switch module, an isolation switch, and a control module, where a first end of the switch module is connected to the battery, a second end of the switch module is connected to a first input end of the first auxiliary power supply, a control end of the switch module is connected to a first end of the isolation switch, a second end of the isolation switch is connected to a positive electrode of the battery, the first capacitor is connected between the first input end of the first auxiliary power supply and a second input end of the first auxiliary power supply, and the second input end of the first auxiliary power supply and a negative electrode of the battery are connected to reference ground. The control module may be configured to:

when being powered on and a voltage of the power bus is less than a first threshold, control the conversion circuit to output electric energy stored in the battery to the inverter through the power bus. The isolation switch may be configured to: when receiving a black start signal, connect a path between the battery and the control end of the switch module, so that the switch module connects a path between the battery and the first capacitor, to supply power to the first auxiliary power supply after a voltage of the first capacitor reaches a preset voltage. The first auxiliary power supply may be configured to supply power to the control module after receiving the supplied power.

Herein, the black start signal is generated when the inverter has no power supply. In this case, the inverter needs to obtain electric energy from the power bus connected to the battery pack, and starts to operate. The black start signal may include a near-end signal or a far-end signal. The near-end signal is a signal generated when a manually operable black start button is triggered to be turned on. The far-end signal is generated when a black start control instruction is received. The black start control instruction may be sent by a controller related to the inverter or the energy storage system. The first auxiliary power supply may be a direct current (DC)/DC converter or the like. The isolation switch may be configured to isolate a control signal (for example, the black start signal) from a power circuit (for example, a circuit between the battery and the control module), to implement effective electrical isolation and improve system stability and security. The preset voltage is greater than a start voltage of the first auxiliary power supply.

In the embodiments, after the isolation switch in the battery pack receives the black start signal, the switch module is turned on, so that energy of the battery can be transferred to the first auxiliary power supply through the turned-on switch module and the first capacitor. After being powered on, the first auxiliary power supply may supply power to the control module. After detecting that a voltage of the power bus is low, the control module controls the conversion circuit to output energy of the battery to the power bus. In this way, the inverter may obtain the electric energy from the power bus to start to operate, and complete black start. In the battery pack, the isolation switch and the switch module are disposed, so that the first auxiliary power supply can obtain the electric energy from the battery, and supply power to the control module. When a black start function is implemented, no additional power supply needs to be added. Therefore, costs are low, and an operation is simple.

In a possible implementation, the switch module in the black start circuit may include a main switch, a black start switch, and a voltage stabilizer unit, a first end and a second end of the main switch are respectively connected to the first end and the second end of the switch module, a control end of the main switch is connected to a second end of the black start switch, a control end of the black start switch is connected to an output end of the voltage stabilizer unit, a first end of the black start switch and a common end of the voltage stabilizer unit are connected to the reference ground, and an input end of the voltage stabilizer unit is connected to the control end of the switch module. The voltage stabilizer unit may be configured to: when the isolation switch is turned on, output a first voltage signal to drive the black start switch to be turned on. The black start switch may be configured to enable the control end of the main switch to receive a second voltage signal when the black start switch is turned on. The main switch may be configured to be turned on when the control end of the main switch receives the second voltage signal, to connect the path between the battery and the first capacitor. For example, the main switch and the black start switch may be various controllable switches, such as a triode, an insulated gate bipolar transistor (IGBT), or a metal-oxide-semiconductor field-effect transistor (MOSFET). The black start switch may be turned on when the control end receives a high level signal. The main switch may be turned on when the control end receives a low level signal.

In this way, in the battery pack, the isolation switch, the black start switch, the main switch, and the voltage stabilizer unit in the black start circuit operate together. When receiving the black start signal, the isolation switch is turned on, so that the voltage stabilizer unit outputs a proper voltage to drive the black start switch to be turned on. After the black start switch is turned on, the main switch may be turned on, so that the battery supplies power to the first auxiliary power supply through the first capacitor. The first auxiliary power supply may supply supplies power to the control module after being powered on. The control module may enable the stored energy of the battery to be output to the inverter through the power bus. This implements black start. The black start circuit has a simple structure, is easy to operate, and does not need to add an additional controller or power supply to the battery pack, thereby improving reliability of a black start process and reducing costs.

In a possible implementation, the battery pack further includes a second auxiliary power supply, a first diode, and a second diode, a positive electrode of the first diode is connected to the second end of the main switch, a negative electrode of the first diode and a negative electrode of the second diode are both connected to the first input end of the first auxiliary power supply, a positive electrode of the second diode is connected to a first output end of the second auxiliary power supply, a second output end of the second auxiliary power supply is connected to the reference ground, and an input end of the second auxiliary power supply is connected to the power bus. The second auxiliary power supply may be configured to charge the first capacitor when an output voltage of the second auxiliary power supply is greater than an output voltage of the battery, so that the first capacitor supplies power to the first auxiliary power supply after the voltage of the first capacitor reaches the preset voltage. Herein, the second auxiliary power supply may also be a DC/DC converter, and the output voltage of the second auxiliary power supply is higher than the output voltage of the first auxiliary power supply. Two diodes opposite to each other are disposed, and anodes of the two diodes are respectively connected to the second auxiliary power supply and the battery, so that the second auxiliary power supply and the battery contend to supply power to the first auxiliary power supply, thereby ensuring that the control module can always obtain electric energy when operating. This structure is simple, easy to operate, and has low costs.

In a possible implementation, the black start circuit further includes a dormancy switch, and a first end and a second end of the dormancy switch are respectively connected to the first end and the second end of the black start switch. The black start signal ends after the black start signal lasts for preset duration, and when the black start signal ends, the black start switch is turned off. The control module is further configured to control, within the preset duration after the black start switch is turned on, the dormancy switch to be turned on, so that the control end of the main switch receives the second voltage signal.

The dormancy switch may be a controllable switch, such as a relay, a direct current contactor, a triode, an IGBT, or an MOSFET. In this way, the dormancy switch is disposed, and the main switch is turned on or off by controlling a state of the dormancy switch, so that the battery can provide the electric energy or cut off power. Therefore, power supplied by the battery can be cut off at proper time by controlling the dormancy switch, thereby avoiding power overdischarge caused by continuous discharge of the battery. An operation is simple, and costs are low.

In a possible implementation, the control module is further configured to: when a voltage of the battery is less than a second threshold and the dormancy switch is in a turned-on state, control the dormancy switch to be turned off. The main switch is further configured to be turned off when the dormancy switch and the black start switch each are in a turned-off state, so that the path between the battery and the first capacitor is disconnected. In this way, the dormancy switch is controlled to enable the battery pack to enter a dormancy state, so that it can be ensured that power overdischarge is not caused due to self-consumption or the like when a battery level is low, thereby reducing a possibility of battery damage, ensuring that next black start can be performed reliably, and improving system reliability.

In a possible implementation, the battery pack further includes a second auxiliary power supply and a handover switch; the second auxiliary power supply is configured to transmit electric energy on the power bus to the first auxiliary power supply through the first capacitor; the handover switch is configured to disconnect an electrical connection between the second auxiliary power supply and the first capacitor when an electrical connection between the first capacitor and the battery is connected, or connect the electrical connection between the second auxiliary power supply and the first capacitor when the electrical connection between the first capacitor and the battery is disconnected; and the control module is configured to: when the main switch is in a turned-on state, control the handover switch to connect the electrical connection between the first capacitor and the battery. Herein, the second auxiliary power supply may be a DC/DC converter, and an output voltage of the second auxiliary power supply is greater than the output voltage of the first auxiliary power supply. In this way, the handover switch is added, so that a path connected between the battery and the first auxiliary power supply may be added. This helps control, after the black start signal ends, the handover switch to control the battery to supply power or cut off the power supplied by the battery, thereby improving reliability of the battery pack.

In a possible implementation, the black start signal ends after the black start signal lasts for preset duration; and the main switch is further configured to be turned off when the handover switch connects the electrical connection between the first capacitor and the battery and the black start signal ends. In this way, the handover switch is added and the handover switch is controlled, to control the electrical connection between the battery and the first capacitor to be connected or disconnected, so that the battery can provide power or cut off power. This helps to subsequently cut off power of the battery when the battery level is low, thereby avoiding power overdischarge.

In a possible implementation, the control module is further configured to: when a voltage of the battery is less than a second threshold and the handover switch connects the electrical connection between the first capacitor and the battery, control the handover switch to disconnect the electrical connection between the first capacitor and the battery.

In this way, when the battery level is low, a power supply loop of the battery is cut off by controlling the handover switch. This can avoid power overdischarge caused by continuous discharge of the battery, ensure that the battery pack can be reliably black started next time, and improve reliability of the system.

In a possible implementation, the second auxiliary power supply is configured to charge the first capacitor when the handover switch connects the electrical connection between the second auxiliary power supply and the first capacitor, and the voltage of the power bus is greater than a third threshold, so that the first capacitor supplies power to the first auxiliary power supply after the voltage of the first capacitor reaches the preset voltage, and the third threshold is greater than the first threshold. In this way, when the power bus is powered on, the third auxiliary power supply may output a voltage to supply power to the first auxiliary power supply, so that battery level can be saved in a scenario in which the inverter is started forward.

In a possible implementation, the isolation switch includes an optical coupler or a digital isolator.

According to a second aspect, the embodiments provide an energy storage system. The energy storage system includes a plurality of battery packs according to any one of the first aspect or the implementations of the first aspect. The plurality of battery packs are connected in parallel, and the plurality of battery packs are all connected to a power bus.

In the energy storage system, any battery pack can implement independent black start. These battery packs are connected in parallel. After any battery pack is black started, the power bus is powered on. In this case, another battery packs may operate based on electric energy of the power bus, and may not need to be black started again, thereby simplifying a process and improving black start efficiency of the entire energy storage system. In addition, if a single battery pack is damaged, another normal battery packs can be controlled to black start, thereby ensuring reliability of black start and improving reliability of the energy storage system.

According to a third aspect, the embodiments provide a power conversion system. The power conversion system includes an inverter and the battery pack according to any one of the first aspect or the implementations of the first aspect. A direct current connection end of the inverter is configured to connect to the battery pack, and an alternating current connection end of the inverter is configured to connect to an alternating current power grid or an alternating current load. The inverter is configured to convert a direct current provided by the battery pack into an alternating current, and output the alternating current to supply power to an alternating current power grid or an alternating current load.

In the power conversion system, because the battery pack can implement black start and has low costs, and the battery pack can enter a dormancy state when a battery level is low, power overdischarge can be avoided, reliability of next black start of the battery pack can be improved, and reliability of the power conversion system can be improved.

DETAILED DESCRIPTION OF EMBODIMENTS

A battery pack and an energy storage system provided in the embodiments may be applied to various charging and discharging scenarios, for example, applied to industrial and commercial use, a power station, household use, and a charging station. The energy storage system provided in the embodiments may be configured to provide electric energy for various power loads, and may be used together with a power generation system such as a photovoltaic system and a wind power system to store electric energy, implement energy transfer, improve operating stability of an entire system, and improve power quality.

Figure 1:
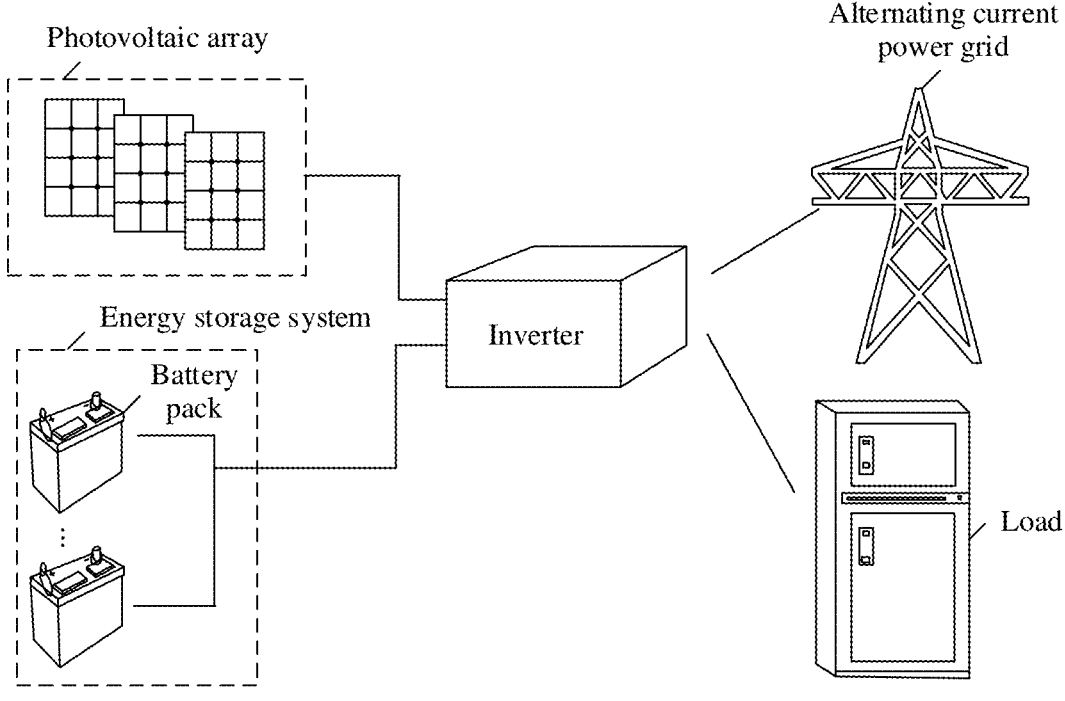
FIG. 1 is a diagram of an application scenario of an energy storage system.

FIG. 1 is a diagram of an application scenario of an energy storage system. The application scenario may be a photovoltaic and energy storage scenario. As shown in FIG. 1, the energy storage system may include a plurality of battery packs, and the plurality of battery packs may be configured to connect to an inverter. For example, the plurality of battery packs in the energy storage system may be connected in parallel, output ends of the plurality of battery packs may be connected to a power bus, and the power bus is connected to the inverter. In this application scenario, both the battery pack and a photovoltaic array may be connected to a direct current connection end of the inverter, and an alternating current connection end of the inverter may be connected to an alternating current power grid and/or a load through a transformer (not shown in FIG. 1). The energy storage system or the photovoltaic array may provide a direct current for the inverter; and the inverter may convert the direct current into an alternating current, and then output the alternating current to the alternating current power grid or supply power to the load. The inverter may further convert an alternating current provided by the alternating current power grid into a direct current for energy storage of the battery pack in the energy storage system. A port voltage of the energy storage system may differ greatly from a voltage of the direct current connection end of the inverter. Therefore, a direct current converter (not shown in FIG. 1) may further exist between the energy storage system and the inverter, to implement voltage boost conversion and voltage buck conversion. It may be understood that the plurality of battery packs in the energy storage system and the inverter may form a power conversion system.

Figure 2:
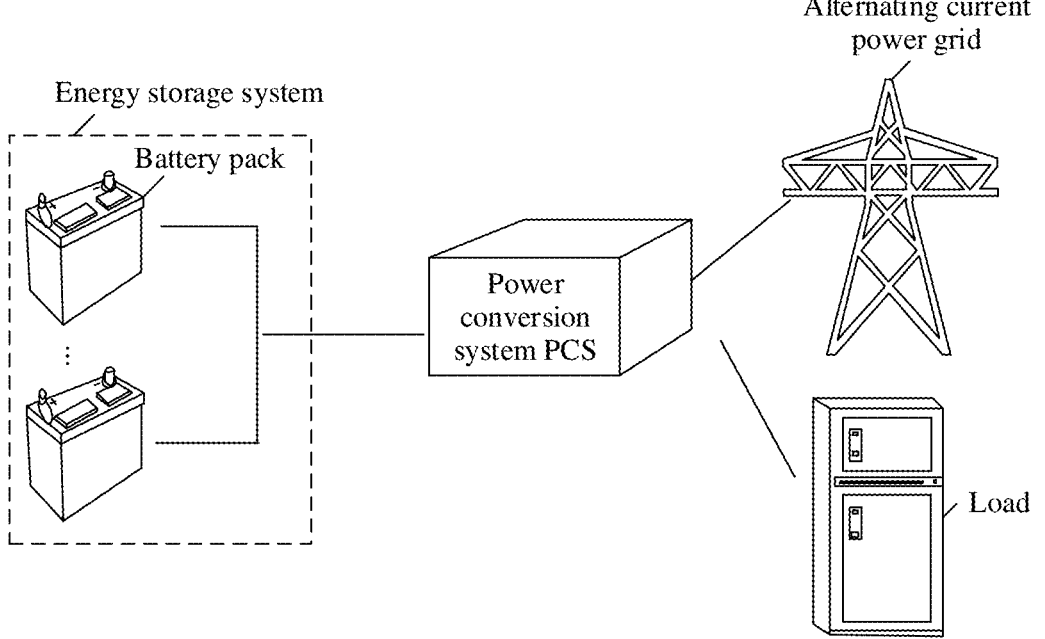
FIG. 2 is a diagram of another application scenario of an energy storage system.

FIG. 2 is a diagram of another application scenario of an energy storage system. The application scenario may be an energy storage scenario. As shown in FIG. 2, the energy storage system may include a plurality of battery packs, and the battery packs are configured to connect to an inverter. For example, the plurality of battery packs in the energy storage system may be connected in parallel, output ends of the plurality of battery packs may be connected to a power bus, and the power bus is connected to the inverter. As shown in FIG. 2, the inverter may be a power conversion system (PCS), and an alternating current connection end of the PCS may be connected to an alternating current power grid and/or a load. In this application scenario, the energy storage system may provide a direct current for the PCS. The PCS converts the direct current provided by the energy storage system into an alternating current and outputs the alternating current to the alternating current power grid or supplies power to the load. The PCS may also obtain power from the alternating current power grid to charge the battery pack in the energy storage system.

In these application scenarios, if the inverter cannot obtain power from a power supply such as a photovoltaic array or the alternating current power grid, the battery pack in the energy storage system needs to supply power to the inverter, so that the inverter can start normally. This process may be referred to as black start.

The following describes the battery pack and the energy storage system provided in the embodiments with reference to FIG. 3 to FIG. 12.

Figure 3:
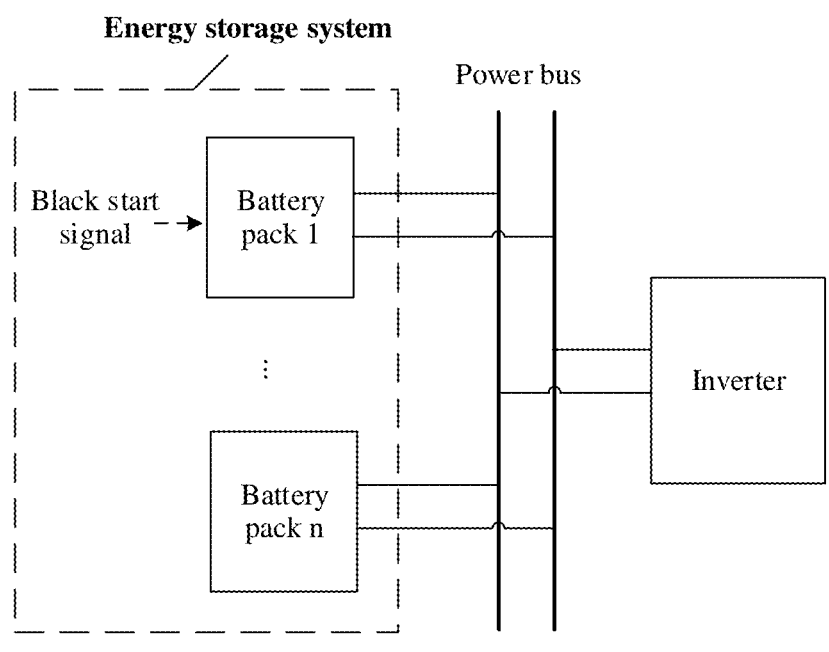
FIG. 3 is a diagram of a structure of an energy storage system.

FIG. 3 is a diagram of a structure of an energy storage system according to the embodiments. The energy storage system may include a plurality of battery packs (for example, a battery pack 1 to a battery pack n in FIG. 3). All plurality of battery packs in the energy storage system are connected to a power bus after being connected in parallel, and the power bus is further configured to connect to an inverter. In the energy storage system, the battery pack may be charged or discharged. When the battery pack is in a charging state, a direct current that is output by the inverter to the power bus may provide charging energy for the battery pack. When the battery pack is in a discharging state, the battery pack may output stored energy to the inverter through the power bus. Any battery pack in the energy storage system may have a black start function. For example, when any battery pack (for example, the battery pack 1 in FIG. 3) receives a black start signal, the battery pack may transmit energy stored in the battery pack to the inverter through the power bus, so that the inverter can obtain electric energy and start to operate, thereby implementing black start. In the embodiments, each battery pack may include a black start circuit. An isolation switch and a switch module are disposed in the black start circuit, so that when the isolation switch receives a black start signal, a path between a battery in the battery pack and a first auxiliary power supply in the black start circuit is connected through the switch module, and electric energy stored in the battery can be used to supply power to a control module in the battery pack through the first auxiliary power supply. Therefore, electric energy in the battery can be output to the inverter through the power bus, thereby implementing black start. The battery pack has simple logic for implementing black start, and does not need to add another controller or power supply. This has low costs and high reliability. In the energy storage system, because the plurality of battery packs are connected in parallel, after the black start function is implemented for any battery pack, the power bus may be powered on, and another battery pack may obtain electric energy from the power bus. The black start function may not be enabled anymore. This can simplify a process, and improve black start efficiency of the entire energy storage system. In addition, if a single battery pack is damaged, another normal battery pack may be controlled to implement black start, thereby implementing redundancy backup of black start. This can improve reliability of the energy storage system.

Figure 4:
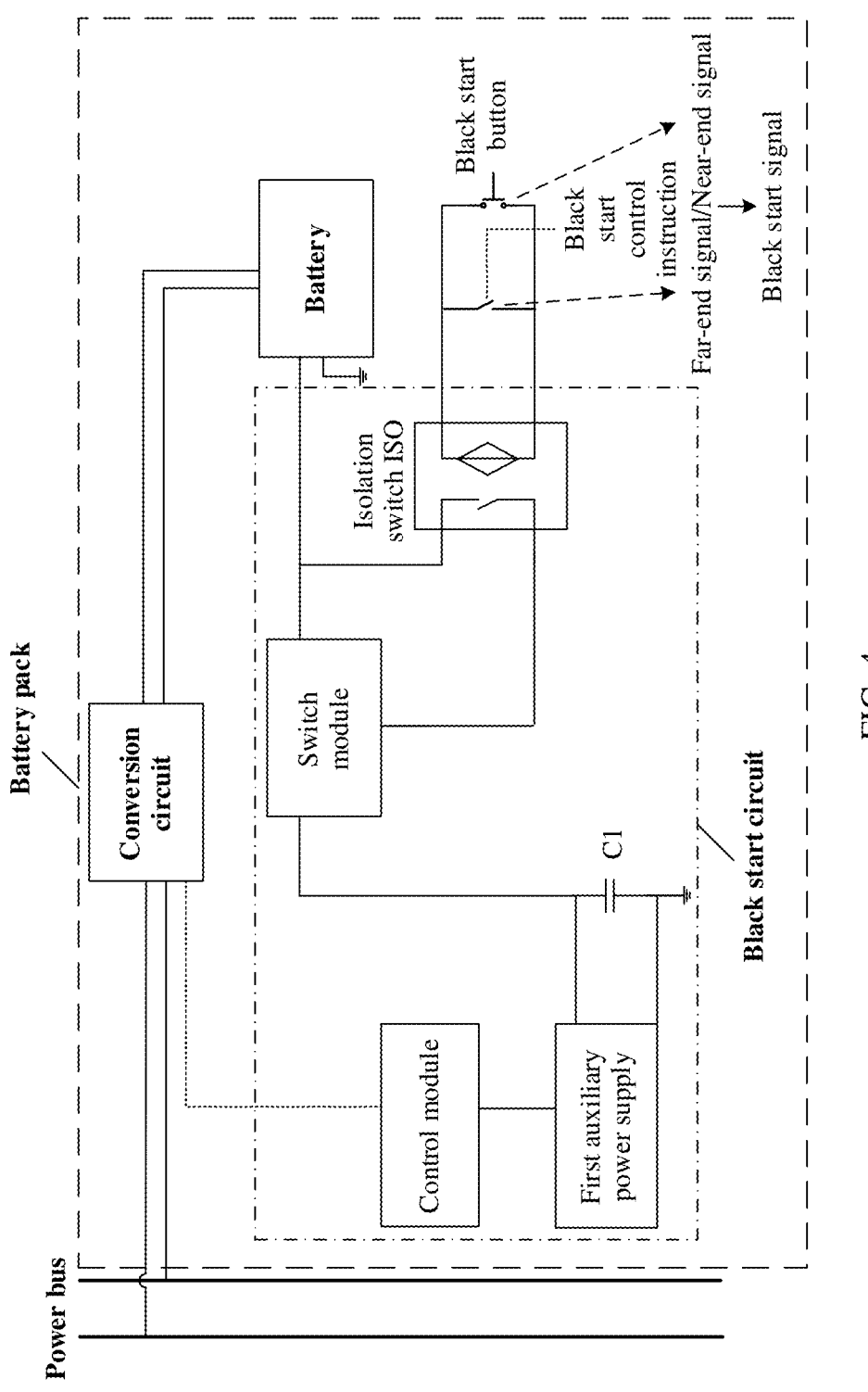
FIG. 4 is a diagram of a structure of a battery pack.

FIG. 4 is a diagram of a structure of a battery pack according to the embodiments. The battery pack may be configured to supply power to an inverter. As shown in FIG. 4, the battery pack may include a battery, a conversion circuit, and a black start circuit. The conversion circuit in the battery pack may be configured to connect to the inverter through a power bus. The conversion circuit may be a DC/DC conversion circuit, and is configured to implement voltage boosting and voltage bucking. The battery in the battery pack may obtain electric energy from the power bus through the conversion circuit for storage, and output the energy stored in the battery to the power bus through the conversion circuit, so that the inverter can obtain the electric energy from the power bus. A black start circuit in the battery pack may include a first auxiliary power supply, a first capacitor (for example, C1 in FIG. 4), a switch module, an isolation switch (for example, ISO in FIG. 4), and a control module. A first end of the switch module is connected to the battery, a second end of the switch module is connected to a first input end of the first auxiliary power supply, a control end of the switch module is connected to a first end of the isolation switch, and a second end of the isolation switch is connected to a positive electrode of the battery. The first capacitor is connected between the first input end of the first auxiliary power supply and a second input end of the first auxiliary power supply, and the second input end of the first auxiliary power supply and a negative electrode of the battery are connected to a reference ground.

In the battery pack, the control module may be configured to: when being powered on and a voltage of the power bus is less than a first threshold, control the conversion circuit to output electric energy stored in the battery to the inverter through the power bus. The isolation switch may be configured to: when receiving a black start signal, connect a path between the battery and the control end of the switch module, so that the switch module connects a path between the battery and the first capacitor, to supply power to the first auxiliary power supply after a voltage of the first capacitor reaches a preset voltage. The first auxiliary power supply may be configured to supply power to the control module after receiving the supplied power.

Herein, the black start signal is generated when the inverter has no power supply. In this case, the inverter needs to obtain electric energy from the power bus connected to the battery pack, and starts to operate. The black start signal may include a near-end signal or a far-end signal. The near-end signal is a signal generated when a manually operable black start button is triggered to be turned on. The far-end signal is generated when a black start control instruction is received. The black start control instruction may be sent by a controller related to the inverter or the energy storage system.

The isolation switch may be configured to isolate a control signal (for example, the black start signal) from a power circuit (for example, a circuit between the battery and the control module), to implement effective electrical isolation, reduce electrical interference that may exist in a signal transmission process, and improve system stability and safety. The isolation switch may be an optical coupler, a digital isolator, or the like. This is not limited. The first auxiliary power supply may be a functional module that is in the battery pack and that is configured to supply power to the control module, for example, a DC/DC converter whose output voltage is +12 V or +5 V. The preset voltage is greater than a start voltage of the first auxiliary power supply.

Figure 5:
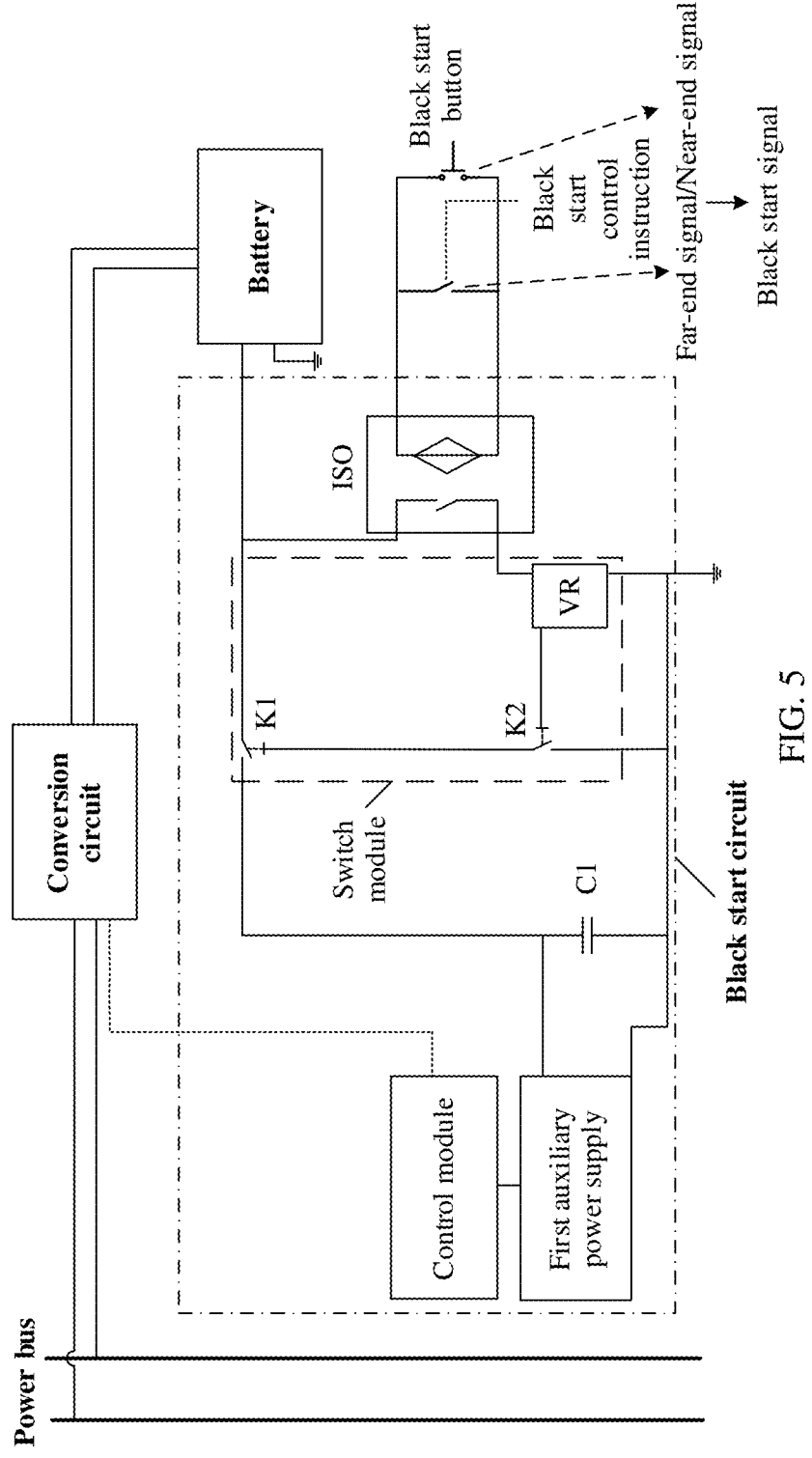
FIG. 5 is a diagram of another structure of a battery pack.

In the embodiments, after the isolation switch in the battery pack receives the black start signal, the switch module is turned on, so that energy of the battery can be transferred to the first auxiliary power supply through the turned-on switch module and the first capacitor. After being powered on, the first auxiliary power supply may supply power to the control module. After detecting that the voltage of the power bus is low, the control module controls the conversion circuit to output energy of the battery to the power bus. In this way, the inverter may obtain the electric energy from the power bus to start to operate, and complete black start. In the battery pack, the isolation switch and the switch module are disposed, so that the first auxiliary power supply can obtain the electric energy from the battery, and supply power to the control module. When a black start function is implemented, no additional power supply needs to be added. Therefore, costs are low, and an operation is simple In a possible implementation, based on the battery pack shown in FIG. 4, as shown in FIG. 5, the switch module in the battery pack may include a main switch (for example, K1 in FIG. 5), a black start switch (for example, K2 in FIG. 5), and a voltage stabilizer unit (for example, VR in FIG. 5). A first end and a second end of the main switch are respectively connected to the first end and the second end of the switch module, a control end of the main switch is connected to a second end of the black start switch, a control end of the black start switch is connected to an output end of the voltage stabilizer unit, a first end of the black start switch and a common end of the voltage stabilizer unit are connected to the reference ground, and an input end of the voltage stabilizer unit is connected to the control end of the switch module.

In the black start circuit included in the battery pack, the voltage stabilizer unit is configured to: when the isolation switch is turned on, output a first voltage signal to drive the black start switch to be turned on. The black start switch is configured to enable the control end of the main switch to receive a second voltage signal when the black start switch is turned on. The main switch is configured to be turned on when the control end of the main switch receives the second voltage signal, to connect the path between the battery and the first capacitor. Herein, the main switch and the black start switch may be various controllable switches such as a triode, an IGBT, or an MOSFET, and may be determined based on an actual application scenario. The black start switch may be turned on when the control end receives a high level signal. The main switch may be turned on when the control end receives a low level signal. For example, the black start switch is a triode. The control end, the first end, and the second end of the black start switch may be a base, an emitter, and a collector respectively. In this case, the black start switch may be an NPN-type triode. For example, the main switch is a triode. The control end, the first end, and the second end of the main switch may be a base, an emitter, and a collector respectively. In this case, the main switch may be a PNP-type triode.

In the battery pack, the isolation switch, the black start switch, the main switch, and the voltage stabilizer unit in the black start circuit operate together. When receiving the black start signal, the isolation switch is turned on, so that the voltage stabilizer unit outputs a proper voltage to drive the black start switch to be turned on. After the black start switch is turned on, the main switch may be turned on, so that the battery supplies power to the first auxiliary power supply through the first capacitor. The first auxiliary power supply may supply power to the control module after being powered on. The control module may enable the stored energy of the battery to be output to the inverter through the power bus. This implements black start. The black start circuit has a simple structure, is easy to operate, and does not need to add an additional controller or power supply to the battery pack, thereby improving reliability of a black start process and reducing costs.

Figure 6:
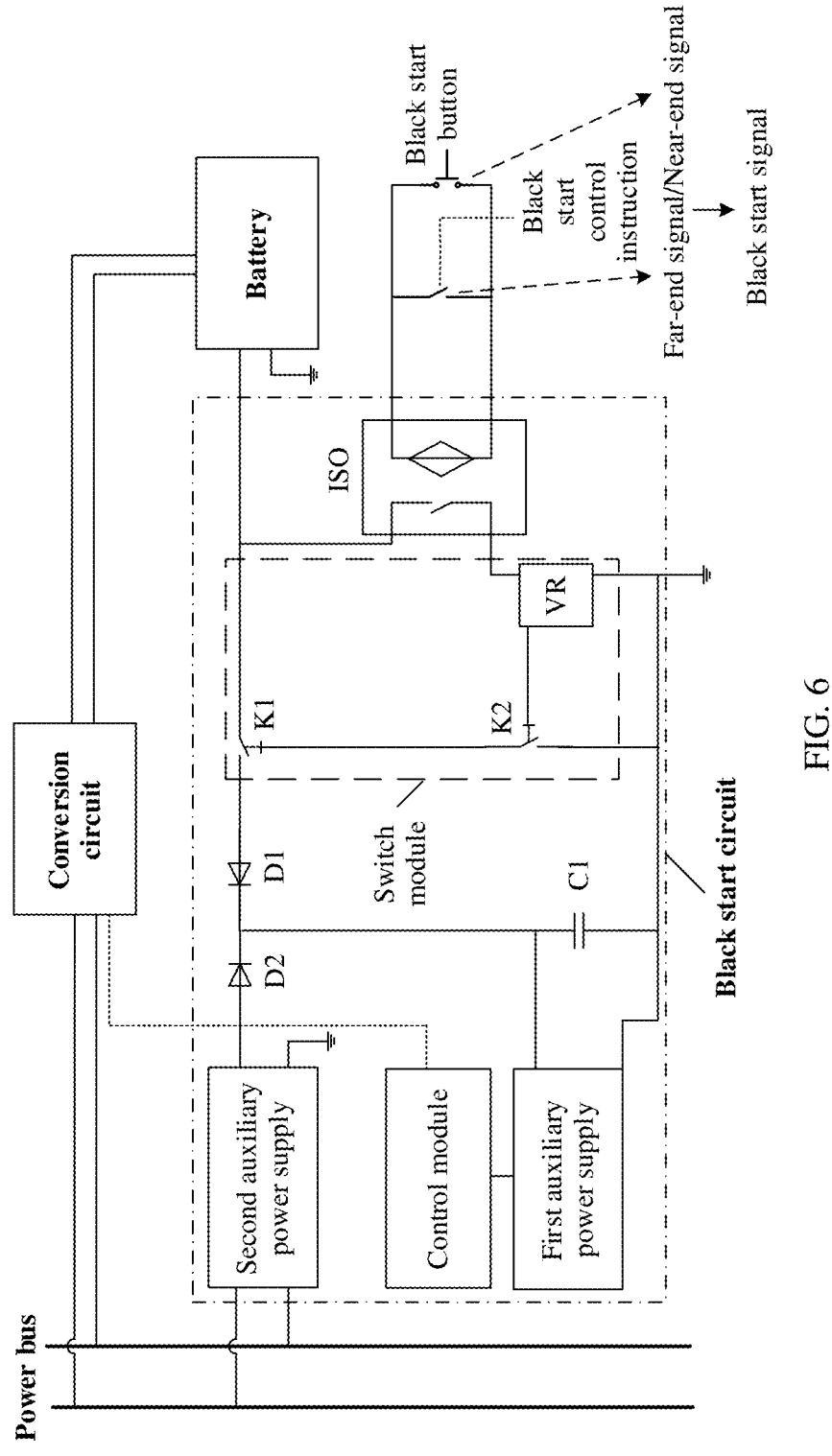
FIG. 6 is a diagram of still another structure of a battery pack.

In a possible implementation, based on the battery pack shown in FIG. 5, as shown in FIG. 6, the black start circuit in the battery pack may further include a second auxiliary power supply, a first diode (for example, D1 in FIG. 6), and a second diode (for example, D2 in FIG. 6). A positive electrode of the first diode is connected to the second end of the main switch, a negative electrode of the first diode and a negative electrode of the second diode are both connected to the first input end of the first auxiliary power supply, a positive electrode of the second diode is connected to a first output end of the second auxiliary power supply, a second output end of the second auxiliary power supply is connected to the reference ground, and an input end of the second auxiliary power supply is connected to the power bus. Herein, the second auxiliary power supply may also be a DC/DC converter, and an output voltage of the second auxiliary power supply may be higher than an output voltage of the first auxiliary power supply. The second auxiliary power supply may be configured to supply power to the first auxiliary power supply when the output voltage of the second auxiliary power supply is greater than an output voltage of the battery. In other words, the second auxiliary power supply may be configured to charge the first capacitor when the output voltage of the second auxiliary power supply is greater than the output voltage of the battery, to supply power to the first auxiliary power supply after the voltage of the first capacitor reaches the preset voltage. It may be understood that, when the output voltage of the second auxiliary power supply is greater than the output voltage of the battery, the second diode is turned on, and the first diode is turned off. Therefore, the second auxiliary power supply may supply power to the first auxiliary power supply, and the battery does not supply power to the first auxiliary power supply. When the output voltage of the battery is greater than the output voltage of the second auxiliary power supply, if the main switch is also turned on, the first diode is turned on, and the second diode is turned off. Therefore, the battery may supply power to the first auxiliary power supply, and the second auxiliary power supply does not supply power to the first auxiliary power supply. In this way, the second auxiliary power supply and the battery may contend to supply power to the first auxiliary power supply. Because the electric energy of the second auxiliary power supply comes from the power bus, when the output voltage of the second auxiliary power supply is greater than the output voltage of the battery, the power bus is powered on at this time, and may be in a forward start scenario in which the inverter normally starts or a black start scenario in which the inverter has no power supply. When the output voltage of the second auxiliary power supply is less than the output voltage of the battery, the second auxiliary power supply may be in the black start scenario in which the inverter has no power supply. In other words, in these scenarios, the first auxiliary power supply can always obtain energy supply from the battery or the second auxiliary power supply, and provide electric energy for the control module based on the energy, to ensure that the control module can send a corresponding control signal, so that a system in which the battery pack is located can black start or run normally. In the forward start scenario in which the inverter normally starts, the second auxiliary power supply with a larger output voltage is used to supply power to the first auxiliary power supply, so that electric energy of the battery can be saved, a quantity of battery discharge times can be reduced, and reliability of the battery pack and the energy storage system can be improved.

Figure 7:
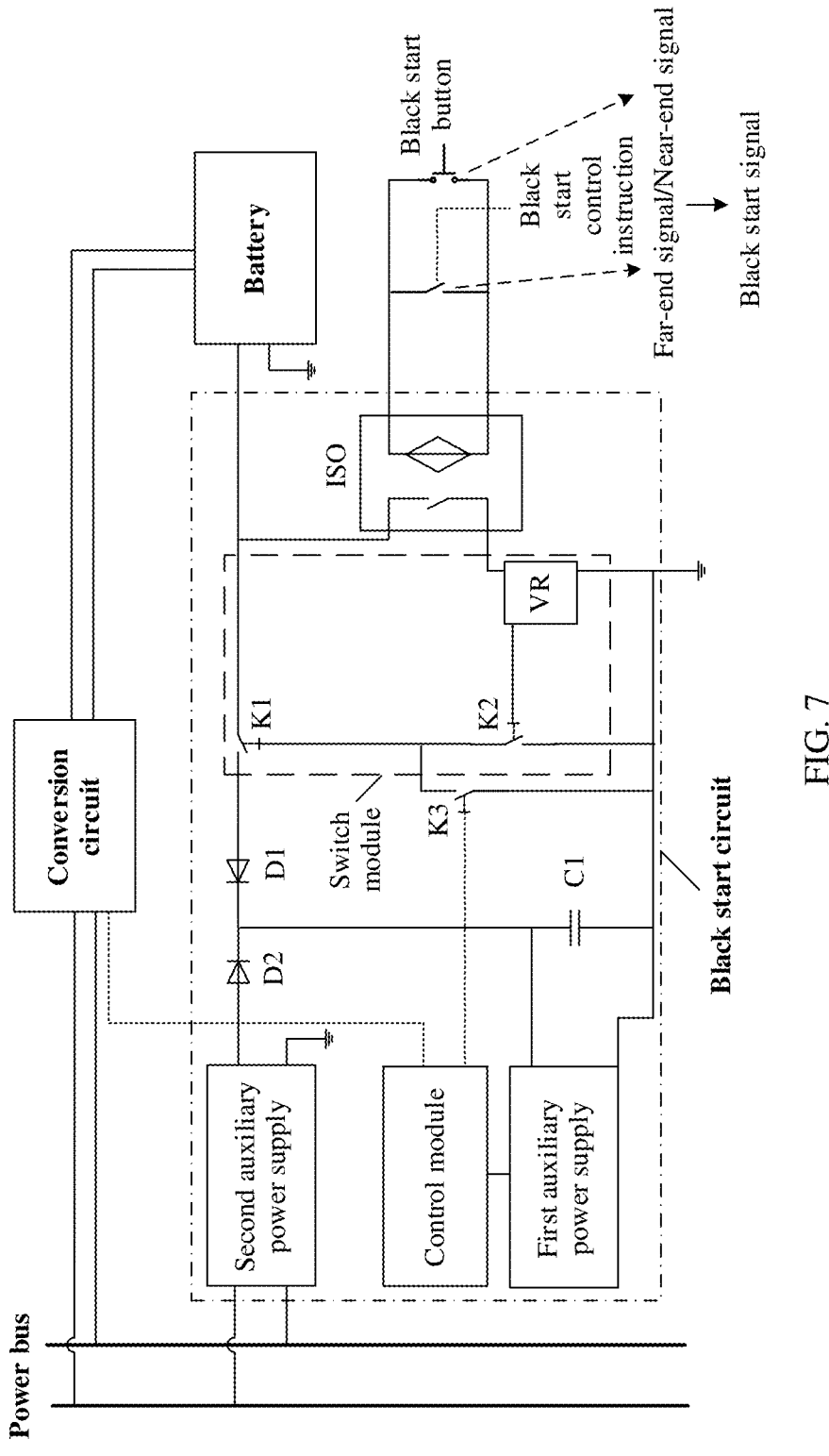
FIG. 7 is a diagram of still yet another structure of a battery pack.
Figure 8:
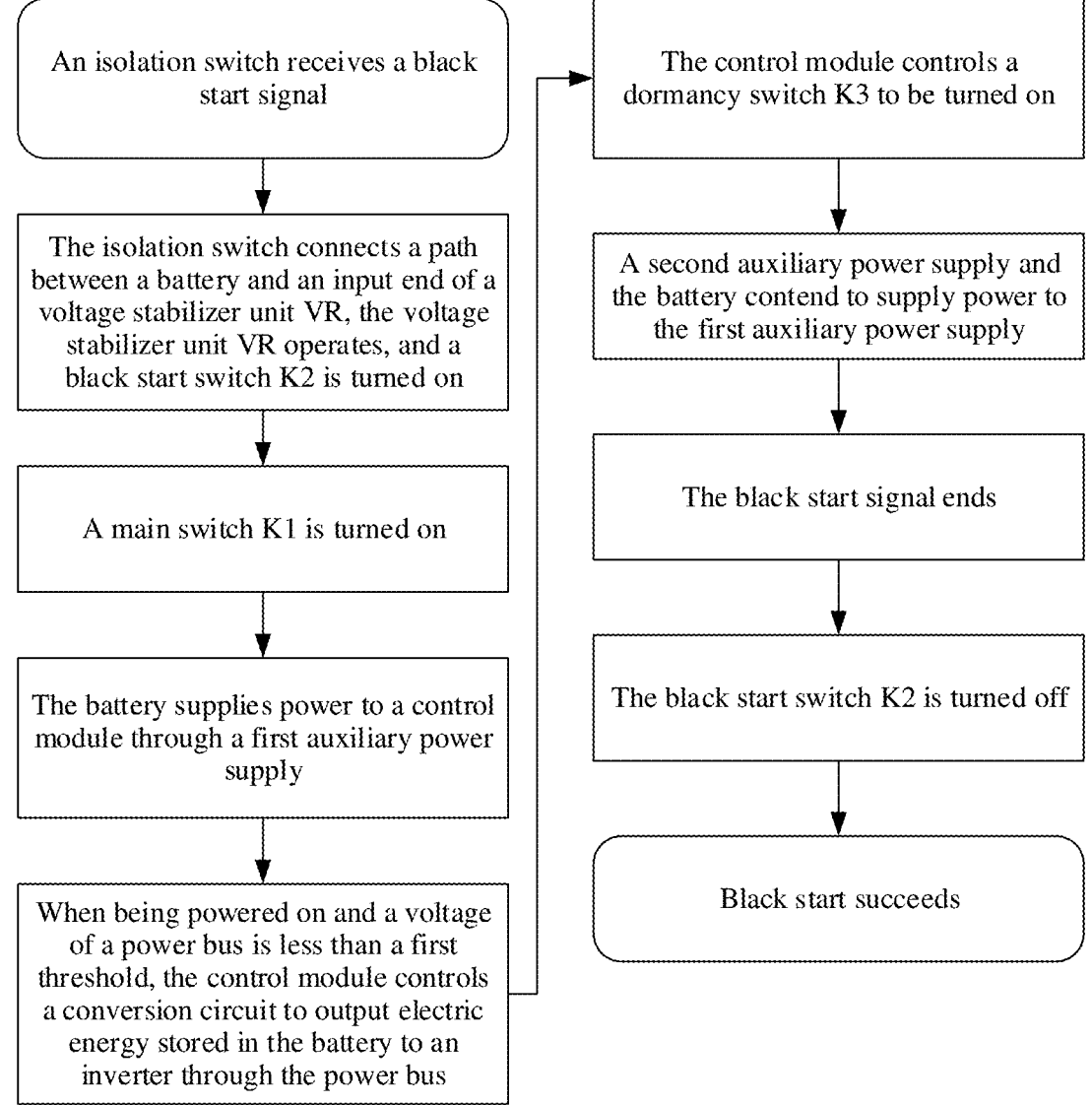
FIG. 8 is a schematic flowchart of black start of a battery pack with the structure shown in FIG. 7.

In a possible implementation, based on the battery pack shown in FIG. 5 or FIG. 6, the black start circuit may further include a dormancy switch. For ease of description, is the embodiments are described by using an example in which the battery pack shown in FIG. 6 includes the dormancy switch. As shown in FIG. 7, a first end and a second end of the dormancy switch (for example, K3 in FIG. 7) are respectively connected to the first end and the second end of the black start switch. The dormancy switch may be turned on or off based on a control signal of the control module. The dormancy switch may be any controllable switch, such as a relay, a direct current contactor, a triode, an IGBT, or an MOSFET, and may be determined based on an actual application scenario. In the embodiments, the black start signal may end after lasting for preset duration. When the black start signal ends, the black start switch is turned off. The control module in the battery pack may be further configured to control, within the preset duration after the black start switch is turned on, the dormancy switch to be turned on, so that the control end of the main switch receives the second voltage signal, and the main switch may still be turned on. It may be understood that, after the isolation switch receives the black start signal, the black start signal may last for the preset duration. Within the preset duration, the black start switch is turned on, so that the main switch is turned on, and the battery may supply power to the control module. When the control module is powered on and the voltage of the power bus is less than the first threshold, the control module may control the conversion circuit to output the electric energy stored in the battery to the inverter through the power bus. The control module may further control the dormancy switch to be turned on. Before the black start signal ends, both the black start switch and the dormancy switch are turned on, and the main switch may always be in a turned-on state, so that energy stored in the battery can be used to supply power to the control module. It may be understood that, when the battery pack further includes the second auxiliary power supply and the foregoing two diodes, the second auxiliary power supply and the battery may contend to supply power to the first auxiliary power supply when the main switch is turned on. When the black start signal ends, the black start switch is turned off and black start succeeds. In this case, the dormancy switch is in the turned-on state. Therefore, the main switch may still be in the turned-on state, and energy stored in the battery may continue to be used to supply power to the control module. FIG. 8 is a schematic flowchart of black start of a battery pack with a structure shown in FIG. 7. After black start is complete, the dormancy switch may be turned off to cut off the power supplied by the battery. Herein, a dormancy switch is added to the black start circuit, so that the main switch is turned on or off by controlling a state of the dormancy switch, so that the battery can provide the electric energy or cut off power. Therefore, power supplied by the battery can be cut off at proper time by controlling the dormancy switch, thereby avoiding power overdischarge caused by continuous discharge of the battery.

Figure 9:
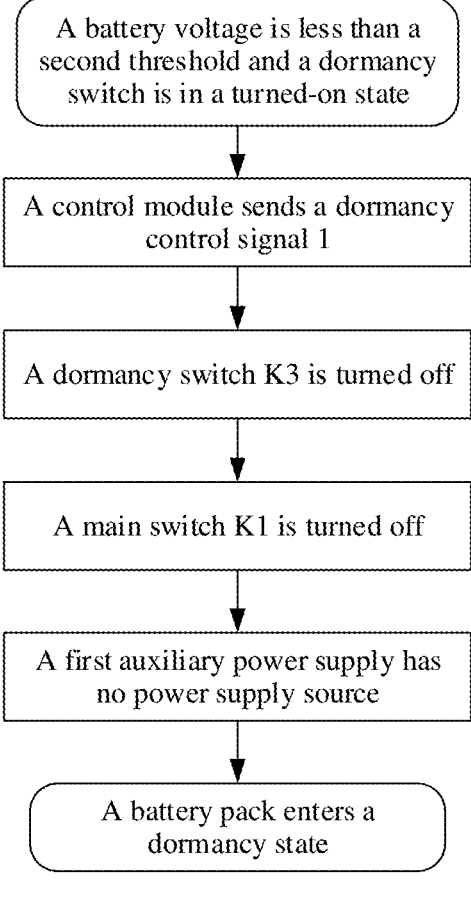
FIG. 9 is a schematic flowchart of entering a dormancy state by a battery pack with the structure shown in FIG. 7.

In a possible implementation, the control module is further configured to: when a voltage of the battery is less than a second threshold and the dormancy switch is in a turned-on state, control the dormancy switch to be turned off. Herein, the voltage of the battery may be replaced with another electrical parameter for measuring energy stored in the battery, for example, a state of charge (SOC) (also referred to as remaining battery lever). This is not limited. The second threshold may be a small value close to running out of battery, and is determined based on an actual scenario. When the voltage of the battery is less than the second threshold, if the battery continues to discharge, power over-discharge occurs, and causes damage. Therefore, the control module may send the control signal (the control signal may be referred to as a dormancy control signal 1) to control the dormancy switch in the black start circuit to be turned off. When the dormancy switch is turned off and the black start switch is also in a turned-off state, the main switch is turned off accordingly, a path between the battery and the first auxiliary power supply is disconnected, and the battery no longer supplies electric energy to the first auxiliary power supply. In this case, if the battery pack does not include the second auxiliary power supply, or the battery pack includes the second auxiliary power supply but the power bus has no voltage output, the first auxiliary power supply has no power supply source, and the control module also has no power supply source. In this case, it may be referred to that the battery pack enters a dormancy state. FIG. 9 is a schematic flowchart of entering a dormancy state by a battery pack with a structure shown in FIG. 7. In this way, the dormancy switch is controlled to enable the battery pack to enter a dormancy state, so that it can be ensured that power over-discharge is not caused due to self-consumption or the like when a battery level is low, thereby reducing a possibility of battery damage, ensuring that next black start can be performed reliably, and improving system reliability.

Figure 10:
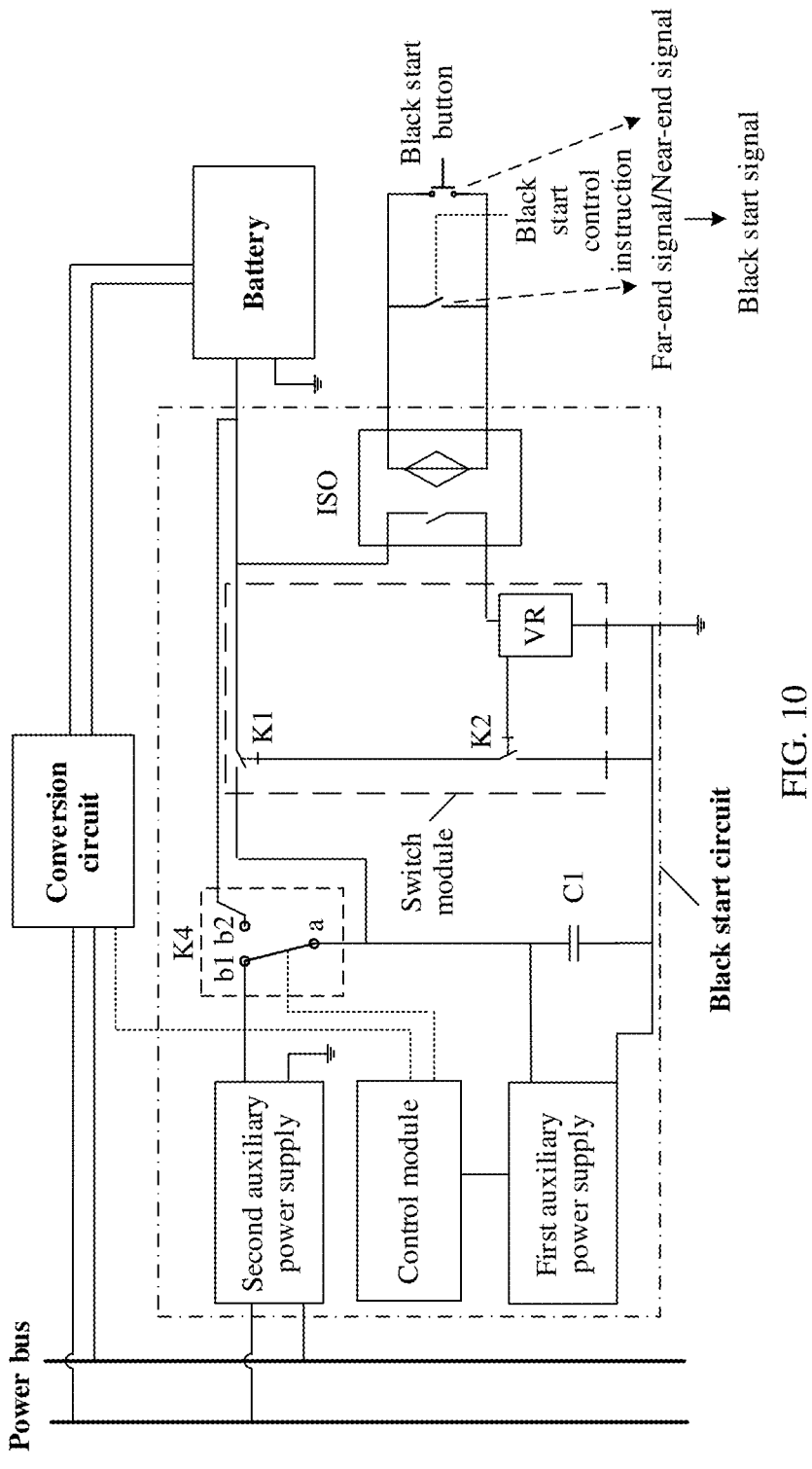
FIG. 10 is a diagram of a further structure of a battery pack.

In a possible implementation, based on the battery pack shown in FIG. 5, as shown in FIG. 10, the black start circuit in the battery pack may further include a second auxiliary power supply and a handover switch (K4 in FIG. 10). A first output end of the second auxiliary power supply may be connected to a handover switch, a second output end of the second auxiliary power supply may be connected to the reference ground, and an input end of the second auxiliary power supply may be connected to a power bus. The second auxiliary power supply may be configured to transmit electric energy on the power bus to the first auxiliary power supply through the first capacitor. Herein, the second auxiliary power supply may be a DC/DC converter, and an output voltage of the second auxiliary power supply is greater than the output voltage of the first auxiliary power supply.

The handover switch may be configured to disconnect an electrical connection between the second auxiliary power supply and the first capacitor when an electrical connection between the first capacitor and the battery is connected, or connect the electrical connection between the second auxiliary power supply and the first capacitor when the electrical connection between the first capacitor and the battery is disconnected. For example, the handover switch may be a single-pole double-throw switch. In this case, the handover switch may include a movable end (for example, an end a in FIG. 10) and two fasten ends (for example, an end b1 and an end b2 in FIG. 10). The movable end of the handover switch is connected to the first input end of the first auxiliary power supply and the second end of the main switch, the second fasten end (for example, the end b2 in FIG. 10) of the handover switch is connected to the positive electrode of the battery, and the first fasten end (for example, the end b1 in FIG. 10) of the handover switch is connected to the first output end of the second auxiliary power supply.

The control module in the battery pack may be configured to: when the main switch is in a turned-on state, control the handover switch to connect the electrical connection between the first capacitor and the battery. For example, the control module may control the movable end of the handover switch to connect to the second fasten end. In this way, after the isolation switch receives the black start signal, the main switch is turned on, and the energy stored in the battery may be transferred to the first auxiliary power supply through the turned-on main switch. After the handover switch connects the electrical connection between the first capacitor and the battery, the energy stored in the battery may be further transferred to the first auxiliary power supply through the handover switch, and the first auxiliary power supply supplies power to the control module, to implement black start. The handover switch is added, so that a path connected between the battery and the first auxiliary power supply may be added. This helps control, after the black start signal ends, the handover switch to control the battery to supply power or cut off the power supplied by the battery, thereby improving reliability of the battery pack.

Figure 11:
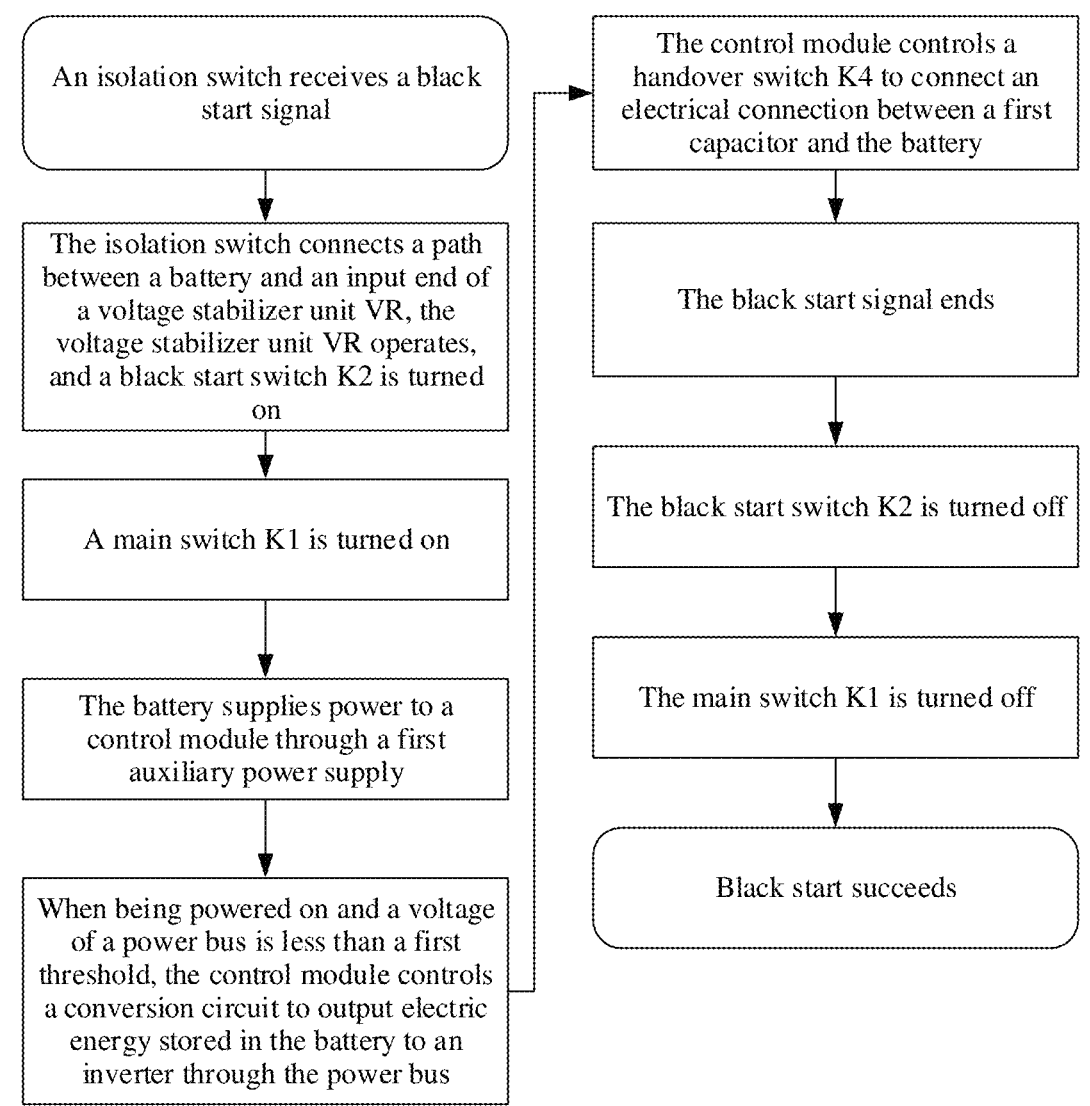
FIG. 11 is a schematic flowchart of black start of a battery pack with the structure shown in FIG. 10.

In a possible implementation, the black start signal may end after preset duration. In this case, before the black start signal ends, the main switch is in the turned-on state, and the handover switch may connect the electrical connection between the first capacitor and the battery. When the black start signal ends, the black start switch is turned off, the main switch is turned off accordingly, and black start succeeds. The electrical connection between the first capacitor and the battery is still connected by the handover switch. Therefore, the battery may continue to supply power to the first auxiliary power supply through the handover switch. When power supplied by the battery needs to be cut off subsequently, the handover switch is controlled to cut off the electrical connection between the battery and the first capacitor. In this way, the handover switch is added and the handover switch is controlled, to control the electrical connection between the battery and the first capacitor to be connected or disconnected, so that the battery can provide power or cut off power. This helps to subsequently cut off power of the battery when the battery level is low, thereby avoiding power overdischarge. FIG. 11 is a schematic flowchart of black start of a battery pack with a structure shown in FIG. 10.

Figure 12:
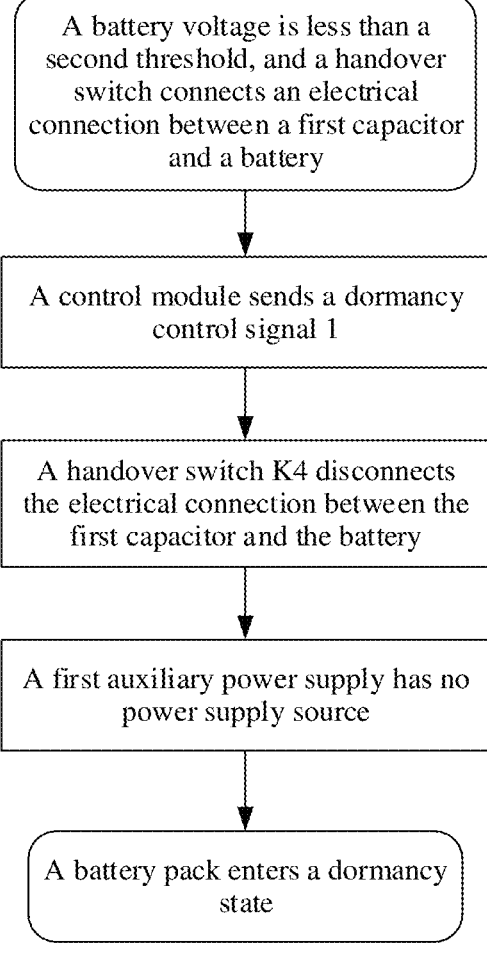
FIG. 12 is a schematic flowchart of entering a dormancy state by a battery pack with the structure shown in FIG. 10.

In a possible implementation, the control module in the battery pack may be configured to: when a voltage of the battery is less than a second threshold and the handover switch connects the electrical connection between the first capacitor and the battery, control the handover switch to disconnect the electrical connection between the first capacitor and the battery. Herein, the voltage of the battery may be replaced with another electrical parameter for measuring energy stored in the battery, for example, a state of charge (SOC) (also referred to as remaining battery level). This is not limited. The second threshold may be a value close to running out of battery, and is determined based on an actual scenario. When the voltage of the battery is less than the second threshold, if the battery continues to discharge, power overdischarge occurs, and causes damage. Therefore, the control module may send a control signal (the control signal may be referred to as a dormancy control signal 1), to control the handover switch in the black start circuit to disconnect the electrical connection between the battery and the first capacitor. In this case, if the power bus has no voltage output, and the main switch is also in a turned-off state, neither the battery nor the second auxiliary power supply supplies power to the first auxiliary power supply, the control module has no power supply source, and the battery pack may enter a dormancy state. FIG. 12 is a schematic flowchart of entering a dormancy state by a battery pack with a structure shown in FIG. 10. In this way, when the battery level is low, a power supply loop of the battery is cut off by controlling the handover switch. This can avoid power overdischarge caused by continuous discharge of the battery, ensure that the battery pack can be reliably black started next time, and improve reliability of the system.

In a possible implementation, the second auxiliary power supply in the battery pack may be configured to: when the handover switch connects the electrical connection between the second auxiliary power supply and the first capacitor, and the voltage of the power bus is greater than a third threshold, supply power to the first auxiliary power supply. For example, the second auxiliary power supply may be configured to: when the handover switch connects the electrical connection between the second auxiliary power supply and the first capacitor, and the voltage of the power bus is greater than the third threshold, charge the first capacitor, so that the first auxiliary power supply supplies power to the first capacitor after the voltage of the first capacitor reaches the preset voltage. The third threshold is greater than the first threshold. Herein, the voltage of the power bus is greater than the third threshold, the power bus is powered on, and the second auxiliary power supply may output a voltage. Therefore, the second auxiliary power supply may supply power to the first auxiliary power supply through the first capacitor, to supply power to the control module. The electric energy in the power bus may come from the inverter. In this case, the inverter may be in a forward start scenario, that is, a scenario in which the inverter may start to operate based on electric energy provided by a power supply other than the battery pack, such as a photovoltaic array or an alternating current power grid. The second auxiliary power supply (instead of the battery) supplies power to the first auxiliary power supply, to supply power to the control module in the battery pack. This can save energy of the battery, reduce a quantity of discharge times of the battery, and help improve reliability of the battery pack. In addition, control logic is simple, and an operation is simple.

Optionally, when the voltage of the power bus is greater than the third threshold and the handover switch connects the electrical connection between the second auxiliary power supply and the first capacitor, the power bus is powered on, and the second auxiliary power supply may first supply power to the first auxiliary power supply through the first capacitor, so that the first auxiliary power supply supplies power to the control module. The control module may be configured to: when being powered on and the voltage of the power bus is greater than the third threshold, control the handover switch to connect the electrical connection between the first capacitor and the battery. At an instant of handover, the second auxiliary power supply may further directly provide auxiliary power supply for the control module. Power of the auxiliary power supply is low, so that a transient power failure of the control module can be avoided. After the handover switch connects the electrical connection between the first capacitor and the battery, the battery may supply power to the first auxiliary power supply. In this way, the battery may supply power to the first auxiliary power supply for a long time. In comparison with a solution in which the power bus supplies power to the first auxiliary power supply through the second auxiliary power supply, this avoids multi-level voltage conversion, improves power supply efficiency, and improves energy output efficiency of the battery.

In the embodiments, the isolation switch and the switch module are disposed in the black start circuit in the battery pack. When receiving the black start signal, the isolation switch may connect the path between the battery and the control end of the switch module, so that the switch module connects the path between the battery and the first capacitor, so that the first auxiliary power supply supplies power to the control module. The control module may control the conversion circuit to output energy stored in the battery to the inverter through the power bus, to implement black start. In this manner, energy of the battery is used to supply power to the first auxiliary power supply, so that black start can be implemented by supplying power to the control module, and no additional controller or black start power supply is required. This has low costs and is easy to operate. In addition, the dormancy switch may be added to the black start circuit, and when the battery level is low, the dormancy switch is controlled to cut off a power supply loop of the battery, thereby avoiding power overdischarge of the battery. Alternatively, the handover switch is added between the first auxiliary power supply and the battery, and when the battery level is relatively low, the handover switch is controlled to cut off the power supply loop of the battery, thereby avoiding power overdischarge of the battery. In this way, the battery pack provided in the embodiments can always conveniently implement black start, and can avoid power overdischarge of the battery, thereby improving reliability of black start and system reliability.

The foregoing descriptions are merely specific implementations of the embodiments, but are not intended as limiting. Any variation or replacement readily figured out by a person skilled shall fall within the scope of the embodiments.

The invention claimed is:

1. A battery pack, configured to supply power to an inverter, wherein the battery pack comprises
    a battery,
    a conversion circuit configured to connect to the inverter through a power bus; and
    a black start circuit that
    comprises:
        a first auxiliary power supply;
        a first capacitor connected between a first input end of the first auxiliary power supply and a second input end of the first auxiliary power supply;
        a switch module, wherein a first end of the switch module is connected to the battery and a second end of the switch module is connected to the first input end of the first auxiliary power supply;
        an isolation switch, wherein a control end of the switch module is connected to a first end of the isolation switch and a second end of the isolation switch is connected to a positive electrode of the battery; and
        a control module, wherein the second input end of the first auxiliary power supply and a negative electrode of the battery are connected to a reference ground, and
    the control module is configured to:
    when being powered on and a voltage of the power bus is less than a first threshold, control the conversion circuit to output electric energy stored in the battery to the inverter through the power bus;
    the isolation switch is configured to:
    when receiving a black start signal, connect a path between the battery and the control end of the switch module, so that the switch module connects a path between the battery and the first capacitor, to supply power to the first auxiliary power supply after a voltage of the first capacitor reaches a preset voltage; and
    the first auxiliary power supply is configured to supply power to the control module after receiving the supplied power.

2. The battery pack according to claim 1, wherein the switch module further comprises:
    a main switch,
    a black start switch, and
    a voltage stabilizer unit, a first end and a second end of the main switch are respectively connected to the first end and the second end of the switch module, a control end of the main switch is connected to a second end of the black start switch, a control end of the black start switch is connected to an output end of the voltage stabilizer unit, a first end of the black start switch and a common end of the voltage stabilizer unit are connected to the reference ground, and an input end of the voltage stabilizer unit is connected to the control end of the switch module, and
    the voltage stabilizer unit is configured to:
    when the isolation switch is turned on, output a first voltage signal to drive the black start switch to be turned on;
    the black start switch is configured to:
    when the black start switch is turned on, enable the control end of the main switch to receive a second voltage signal; and
    the main switch is configured to be turned on when the control end of the main switch receives the second voltage signal, to connect the path between the battery and the first capacitor.

3. The battery pack according to claim 2, wherein the battery pack further comprises:
    a second auxiliary power supply,
    a first diode, and
    a second diode, a positive electrode of the first diode is connected to the second end of the main switch, a negative electrode of the first diode and a negative electrode of the second diode are both connected to the first input end of the first auxiliary power supply, a positive electrode of the second diode is connected to a first output end of the second auxiliary power supply, a second output end of the second auxiliary power supply is connected to the reference ground, and an input end of the second auxiliary power supply is connected to the power bus; and
    the second auxiliary power supply is configured to charge the first capacitor when an output voltage of the second auxiliary power supply is greater than an output voltage of the battery, to supply power to the first auxiliary power supply after the voltage of the first capacitor reaches the preset voltage.

4. The battery pack according to claim 2, wherein the black start circuit further comprises a dormancy switch, and a first end and a second end of the dormancy switch are respectively connected to the first end and the second end of the black start switch;
    the black start signal ends after the black start signal lasts for preset duration, and,
    when the black start signal ends, the black start switch is turned off; and
    the control module is further configured to control, within the preset duration after the black start switch is turned on, the dormancy switch to be turned on, so that the control end of the main switch receives the second voltage signal.

5. The battery pack according to claim 3, wherein the black start circuit further comprises a dormancy switch, and a first end and a second end of the dormancy switch are respectively connected to the first end and the second end of the black start switch;

the black start signal ends after the black start signal lasts for preset duration, and, when the black start signal ends, the black start switch is turned off; and the control module is further configured to control, within the preset duration after the black start switch is turned on, the dormancy switch to be turned on, so that the control end of the main switch receives the second voltage signal.

6. The battery pack according to claim 4, wherein the control module is further configured to:

when a voltage of the battery is less than a second threshold and the dormancy switch is in a turned-on state, control the dormancy switch to be turned off; and the main switch is further configured to be turned off when the dormancy switch and the black start switch each are in a turned-off state, so that the path between the battery and the first capacitor is disconnected.

7. The battery pack according to claim 5, wherein the control module is further configured to:

when a voltage of the battery is less than a second threshold and the dormancy switch is in a turned-on state, control the dormancy switch to be turned off; and the main switch is further configured to be turned off when the dormancy switch and the black start switch each are in a turned-off state, so that the path between the battery and the first capacitor is disconnected.

8. The battery pack according to claim 2, further comprising:

a second auxiliary power supply configured to transmit electric energy on the power bus to the first auxiliary power supply through the first capacitor; and a handover switch configured to disconnect an electrical connection between the second auxiliary power supply and the first capacitor when an electrical connection between the first capacitor and the battery is connected, and connect the electrical connection between the second auxiliary power supply and the first capacitor when the electrical connection between the first capacitor and the battery is disconnected, wherein the control module is further configured to:

when the main switch is in a turned-on state, control the handover switch to connect the electrical connection between the first capacitor and the battery.

9. The battery pack according to claim 8, wherein the black start signal ends after the black start signal lasts for preset duration; and the main switch is further configured to be turned off when the handover switch connects the electrical connection between the first capacitor and the battery and the black start signal ends.

10. The battery pack according to claim 9, wherein the control module is further configured to:

when a voltage of the battery is less than a second threshold and the handover switch connects the electrical connection between the first capacitor and the battery, control the handover switch to disconnect the electrical connection between the first capacitor and the battery.

11. The battery pack according to claim 8, wherein the second auxiliary power supply is configured to charge the first capacitor when the handover switch connects the electrical connection between the second auxiliary power supply and the first capacitor, and the voltage of the power bus is greater than a third threshold, to supply power to the first auxiliary power supply after the voltage of the first capacitor reaches the preset voltage, wherein the third threshold is greater than the first threshold.

12. The battery pack according to claim 9, wherein the second auxiliary power supply is configured to charge the first capacitor when the handover switch connects the electrical connection between the second auxiliary power supply and the first capacitor, and the voltage of the power bus is greater than a third threshold, to supply power to the first auxiliary power supply after the voltage of the first capacitor reaches the preset voltage, wherein the third threshold is greater than the first threshold.

13. The battery pack according to claim 10, wherein the second auxiliary power supply is configured to charge the first capacitor when the handover switch connects the electrical connection between the second auxiliary power supply and the first capacitor, and the voltage of the power bus is greater than a third threshold, to supply power to the first auxiliary power supply after the voltage of the first capacitor reaches the preset voltage, wherein the third threshold is greater than the first threshold.

14. The battery pack according to claim 1, wherein the isolation switch comprises an optical coupler.

15. An energy storage system comprising a plurality of battery packs connected in parallel, connected to a power bus; and configured to supply power to an inverter, wherein each battery pack comprises:

a battery, a conversion circuit configured to connect to the inverter through the power bus; and a black start circuit that comprises:

a first auxiliary power supply, a first capacitor connected between a first input end of the first auxiliary power supply and a second input end of the first auxiliary power supply;

a switch module, wherein a first end of the switch module is connected to the battery and a second end of the switch module is connected to the first input end of the first auxiliary power supply;

an isolation switch, wherein a control end of the switch module is connected to a first end of the isolation switch and a second end of the isolation switch is connected to a positive electrode of the battery; and a control module, wherein the second input end of the first auxiliary power supply and a negative electrode of the battery are connected to a reference ground;

the control module is configured to:

when being powered on and a voltage of the power bus is less than a first threshold, control the conversion circuit to output electric energy stored in the battery to the inverter through the power bus;

the isolation switch is configured to:

when receiving a black start signal, connect a path between the battery and the control end of the switch module, so that the switch module connects a path between the battery and the first capacitor, to supply power to the first auxiliary power supply after a voltage of the first capacitor reaches a preset voltage; and the first auxiliary power supply is configured to supply power to the control module after receiving the supplied power.

16. The energy storage system according to claim 15, wherein the switch module further comprises:

a main switch, a black start switch, and a voltage stabilizer unit, a first end and a second end of the main switch are respectively connected to the first end and the second end of the switch module, a control end of the main switch is connected to a second end of the black start switch, a control end of the black start switch is connected to an output end of the voltage stabilizer unit, a first end of the black start switch and a common end of the voltage stabilizer unit are connected to the reference ground, and an input end of the voltage stabilizer unit is connected to the control end of the switch module;

the voltage stabilizer unit is configured to:

when the isolation switch is turned on, output a first voltage signal to drive the black start switch to be turned on;

the black start switch is configured to:

when the black start switch is turned on, enable the control end of the main switch to receive a second voltage signal; and the main switch is configured to be turned on when the control end of the main switch receives the second voltage signal, to connect the path between the battery and the first capacitor.

17. The energy storage system according to claim 16, wherein the battery pack further comprises:

a second auxiliary power supply, a first diode, and a second diode, a positive electrode of the first diode is connected to the second end of the main switch, a negative electrode of the first diode and a negative electrode of the second diode are both connected to the first input end of the first auxiliary power supply, a positive electrode of the second diode is connected to a first output end of the second auxiliary power supply, a second output end of the second auxiliary power supply is connected to the reference ground, and an input end of the second auxiliary power supply is connected to the power bus; and the second auxiliary power supply is configured to charge the first capacitor when an output voltage of the second auxiliary power supply is greater than an output voltage of the battery, to supply power to the first auxiliary power supply after the voltage of the first capacitor reaches the preset voltage.

18. The energy storage system according to claim 16, wherein the black start circuit further comprises:

a dormancy switch, and a first end and a second end of the dormancy switch are respectively connected to the first end and the second end of the black start switch;

the black start signal ends after the black start signal lasts for preset duration, and when the black start signal ends, the black start switch is turned off; and the control module is further configured to control, within the preset duration after the black start switch is turned on, the dormancy switch to be turned on, so that the control end of the main switch receives the second voltage signal.

19. The energy storage system according to claim 17, wherein the black start circuit further comprises:

a dormancy switch, and a first end and a second end of the dormancy switch are respectively connected to the first end and the second end of the black start switch;

the black start signal ends after the black start signal lasts for preset duration, and when the black start signal ends, the black start switch is turned off; and the control module is further configured to control, within the preset duration after the black start switch is turned on, the dormancy switch to be turned on, so that the control end of the main switch receives the second voltage signal.

20. The battery pack according to claim 1, wherein the isolation switch comprises a digital isolator.

* * * * *